US009252609B2

(12) United States Patent
Strauser

(10) Patent No.: US 9,252,609 B2
(45) Date of Patent: Feb. 2, 2016

(54) HANGING FOLDER DEVICE CHARGING SYSTEM

(71) Applicant: Jack Strauser, Seminole, FL (US)

(72) Inventor: Jack Strauser, Seminole, FL (US)

(73) Assignee: DOK SOLUTION LLC, Largo, FL (US)

( * ) Notice: Subject to any disclaimer, the term of this patent is extended or adjusted under 35 U.S.C. 154(b) by 106 days.

(21) Appl. No.: 14/069,401

(22) Filed: Nov. 1, 2013

(65) Prior Publication Data
US 2015/0123593 A1    May 7, 2015

(51) Int. Cl.
*H02J 7/00* (2006.01)
(52) U.S. Cl.
CPC ............. *H02J 7/0042* (2013.01); *H02J 7/0013* (2013.01); *H02J 7/0052* (2013.01)
(58) Field of Classification Search
CPC .................................................... H02J 7/0044
USPC ......................................................... 320/107
See application file for complete search history.

(56) References Cited

U.S. PATENT DOCUMENTS

| 4,527,694 | A  | * | 7/1985  | Bolt et al. ........................ 211/46 |
| 2008/0190330 | A1 | * | 8/2008  | Bart et al. ....................... 108/44 |
| 2009/0158973 | A1 | * | 6/2009  | Felterman ..................... 108/102 |
| 2009/0250373 | A1 | * | 10/2009 | Lane et al. .................... 206/701 |
| 2010/0013431 | A1 | * | 1/2010  | Liu ................................. 320/108 |
| 2011/0006725 | A1 | * | 1/2011  | Wilson .......................... 320/101 |
| 2011/0066494 | A1 | * | 3/2011  | Smith et al. ................. 705/14.49 |
| 2011/0155023 | A1 | * | 6/2011  | Krause et al. ................... 108/26 |
| 2013/0113420 | A1 | * | 5/2013  | Majoris, Jr. ................... 320/107 |
| 2013/0206470 | A1 | * | 8/2013  | Davis ............................. 174/382 |
| 2013/0320916 | A1 | * | 12/2013 | Jang et al. ..................... 320/107 |
| 2014/0125271 | A1 | * | 5/2014  | Wang ............................. 320/107 |

* cited by examiner

*Primary Examiner* — Suchin Parihar
(74) *Attorney, Agent, or Firm* — Larson & Larson, P.A.; Frank Liebenow; Patrick Reid

(57) ABSTRACT

A device charging system includes a base that has two opposing rim edges that are substantially parallel to each other and are spaced apart by a width corresponding to a hanging folder rail width. Several jacks are on a surface of the base, each is electrically connected to a source of power. Several hanging folders, each having integrated hanging folder rails, interface to the two opposing rim edges. The hanging folder rails are of a width corresponding to the hanging folder rail width. Several devices are physically held within a corresponding hanging folder and each device is electrically connected to one of the jacks by a charging cable, thereby providing power from the source of power to charge that device.

19 Claims, 5 Drawing Sheets

HANGING FOLDER DEVICE CHARGING SYSTEM

FIELD

This invention relates to the field of portable devices and more particularly to a system for charging and optionally communicating with a plurality of portable devices.

BACKGROUND

In recent years, the number, type, and size of portable computers or other devices has risen astronomically, both for public use and business use. One thing that all of these devices have in common is a battery that needs to be charged periodically. For a single device, typically, a "wall wart" provides charging power through a connector on the device such as a micro-USB connector or a proprietary connector. This works well for a very small number of devices, but there is often a need for many different devices. For example, in some homes, each family member has a smart phone, a music player, and a tablet computer. Given a family of two adults and three children, this adds up to fifteen devices that at some time or another require charging. If there were sufficient outlets for that many "wall warts" in a kitchen, the clutter, potential for damage, and confusion cause problems in a typical family.

For businesses, often a fleet of devices are available for use, each needing to be charged and/or connected to a computer for data updates, etc. One such scenario is the use of tablet computers in a restaurant, allowing patrons to see the menu and images of the food items, and to place orders, review their bill, etc. In such, there are often tens of tablet computers in an establishment that need to be charged at one time. One might imagine a stack of tablet computers connected to an army of "wall warts," each "wall wart" plugged into an outlet on any of several power strips. Such stacking leads to breaking of the tablet computers, scratching of the displays or plastics, tangled power cables, and a virtual mess. It should be noted that, although good design practices usually include added structural strength around the connectors, it is almost impossible to design a flawless connector on a portable device because of the leverage force that occurs when a small force is exerted on a plug that is inserted in that connector.

What is needed is a system that will methodologically hold and charge several devices, and optionally communicate with the devices while charging.

SUMMARY

In one embodiment, a device charging system is disclosed including a base that has two opposing rim edges that are substantially parallel to each other and are spaced apart by a width corresponding to a hanging folder rail width. Several jacks are on a surface of the base, each is electrically connected to a source of power. Several hanging folders, each having integrated hanging folder rails, interface to the two opposing rim edges. The hanging folder rails are of a width corresponding to the hanging folder rail width. Several devices are physically held within a corresponding hanging folder and each device is electrically connected to one of the jacks by a charging cable, thereby providing power from the source of power to charge that device.

In another embodiment, a method of charging a plurality of devices is disclosed including providing the device charging system described above and connecting a first device to a first port through a first charging cable and placing the first device into a first hanging folder of the folders. Next, a second device is connected to a second port through a second charging cable and the second device is placed into a second hanging folder of the folders, and so on.

In another embodiment, a device charging system is disclosed including a base that has two opposing rim edges that are substantially parallel to each other and spaced apart by a width corresponding to a hanging folder rail width. The base has several jacks and a source of power, each of the jacks is electrically interfaced to the source of power. Several hanging folders with integrated hanging folder rails hang from the two opposing rim edges by the integrated hanging folder rails for holding devices that are to be charged/stored. The hanging folder rails are of a width corresponding to the hanging folder rail width.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
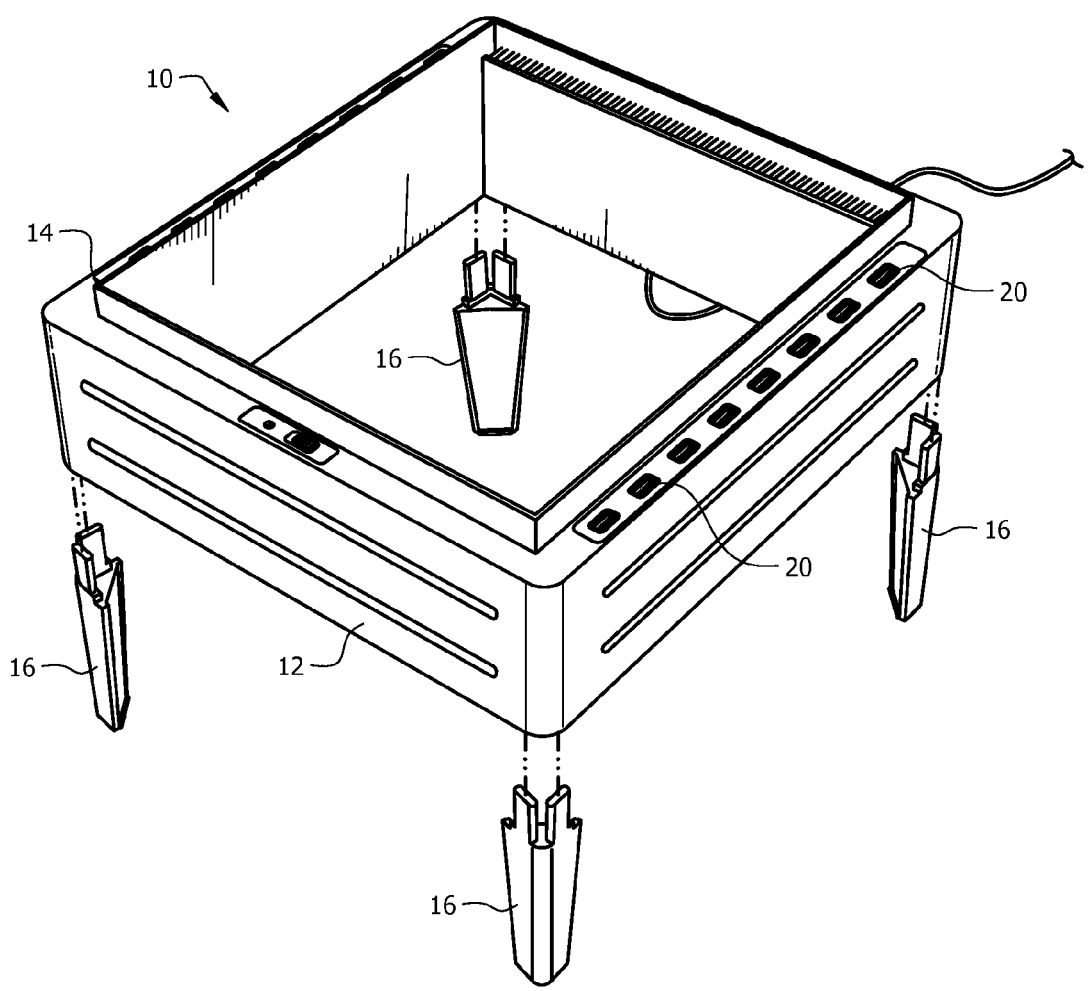
FIG. 1 illustrates a pictorial view of a hanging folder charge station before installation of hanging folders.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a pictorial view of a hanging folder charge station 10 before installation of hanging folders is shown. As will be shown, the hanging folder charge station 10 has a frame 12 that supports the hanging folders 30/32 (see FIG. 2) and provides power and, optionally, data communication to one or more devices 40 (see FIG. 2).

By organizing the devices 40 in hanging folders 30/32, one or many devices are concurrently supported in a substantially vertical orientation, separated from each other by the file folder 30/32. This separation maintains organization and keeps the devices 40 separate and locatable. Damage to the devices 40 is also prevented by reducing the potential for one device 40 to, for example, scratch or break another device 40, as often occurs in an unorganized charging scenario. Although the exemplary devices 40 are shown to be tablet computers 40, any rechargeable-battery-based devices 40 are anticipated in any combination. For example, in one folder 30/32, a tablet computer is placed and charged while in another folder, a smart phone is placed and charged, etc.

Any size frame 12 is anticipated for accepting corresponding sized folders 30/32 such as spacing to accept letter sized folders 30/32 or spacing to accept legal sized folders 30/32. Additionally, by managing the outer dimensions of the frame 12, it is anticipated that the hanging folder charge station 10 is, in some applications, installed within a file cabinet (not shown), thereby providing a more secure charging location since file cabinets often have security devices such as key locks.

Figure 2:
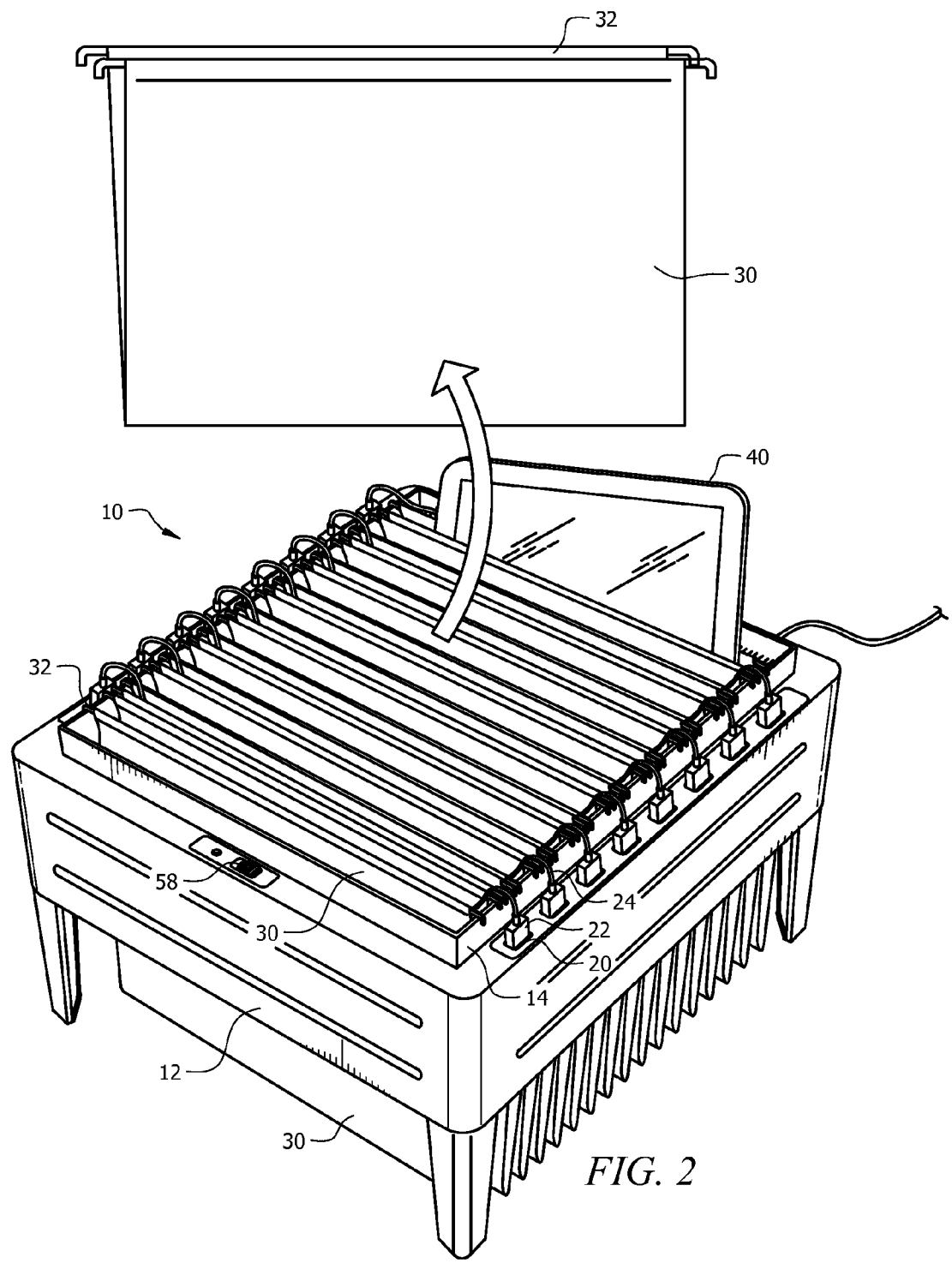
FIG. 2 illustrates a pictorial view of the hanging folder charge station with hanging folders and one device being charged.

In the embodiment shown in FIG. 1, a rim edge 14 is provided for accepting the rails 32 of the file folders 30/32 (see FIG. 2). Although the rim edge 14 is shown circumnavigating the upper surface of the frame 12, there is no restriction on configurations of the rim edge 14. For example, in another embodiment, the rim edge 14 is only on opposing sides of the frame 12. The rim edge 14 is typically sized to accommodate the edges of the file folder frame members 32. The rim edges 14 on opposing sides of the base 12 are preferably substantially parallel to each other and spaced apart by a distance corresponding to the rails 32 of the desired hanging folders 30/32.

In some embodiments, legs 16 are provided to raise the hanging folder charge station 10 from a surface (e.g. desk or file cabinet base) so that the file folders 30/32 hang without being deformed or depressed by contact with the surface. In other embodiments, the base 12 extends deep enough so as to allow proper hanging of the file folders 30/32. The use of legs 16 that are shipped separate from the base 12 and added later (e.g., after purchase) reduces packaging size which often reduces costs of storage, shipping, and distribution.

Also shown in FIG. 1 is a plurality of jacks 20. Any number of jacks 20 are anticipated, typically an equal number of jacks 20 as hanging folders 30/32, but not necessarily so (it is anticipated to have more or less jacks 20 as hanging folders 30/32 in some embodiments). As will be shown, the jacks 20 are connected to the devices 40 to provide power and, optionally data. Although shown as USB ports, which have become somewhat of an industry standard for charging devices 40, any type and combination of jacks 20 are anticipated for the charging ports 20. In some embodiments, instead of jacks 20, a plurality of captured cables (not shown) having proper termination connectors 26 (see FIG. 4) for a specific set of devices 40 are provided. Although captured cables are anticipated, such an embodiment is less desired because this would require different hanging folder charge stations 10 for different types of devices 40 made by different manufacturers.

By providing industry standard jacks for the charging jacks 20, practically any device 40 is connectable to the charging jacks 20 through a cable 22/24/26 (see FIG. 4), since the cable 22/24/26 is typically supplied with the device 40. For example, devices 40 with proprietary connectors are typically provided with cables 22/24/26 in which the device connector 26 is the proprietary connector and the system-end plug 22 is an industry standard plug 22 such as a standard USB plug 22.

Referring to FIG. 2, a pictorial view of the hanging folder charge station 10 with hanging folders and one device 40 being charged is shown. In this example, one of the hanging folders 30/32 is shown removed from the hanging folder charge station 10. Hanging folders 30/32 are well known, having a flexible folder portion 30, typically made from card stock or coated card stock and hung by rails 32. The rails 32 interface with the rim edges 14 of the hanging folder charge station 10 as the hanging folders 30/32 interface with folder frames within the typical file cabinets. By incorporating industry standard file folders 30/32; the hanging folder charge station 10 accepts industry standard file folders 30/32 of a corresponding size, allowing the user to replace worn file folders 30/32 and organize using file folder labels (not shown) and various colors of file folders, etc.

In FIG. 2, several cables 24 are shown with plug ends 22 plugged into jacks 20 of the base 12. It is preferred, but not required, that the jacks 20 are industry standard jacks 20 such as USB jacks 20. Any connector arrangement is anticipated for connecting the devices 40 with charging circuitry in the base 12.

In some embodiments, though not required, a switch/indicator 58 is provided to control operation and indicate power is available. It is also anticipated that in some embodiments, other indicators are provided (not shown) indicating charging status for each individual device 40 since the charging status often provided on each device 40 is possibly obscured within the file folder 30/32.

Figure 3:
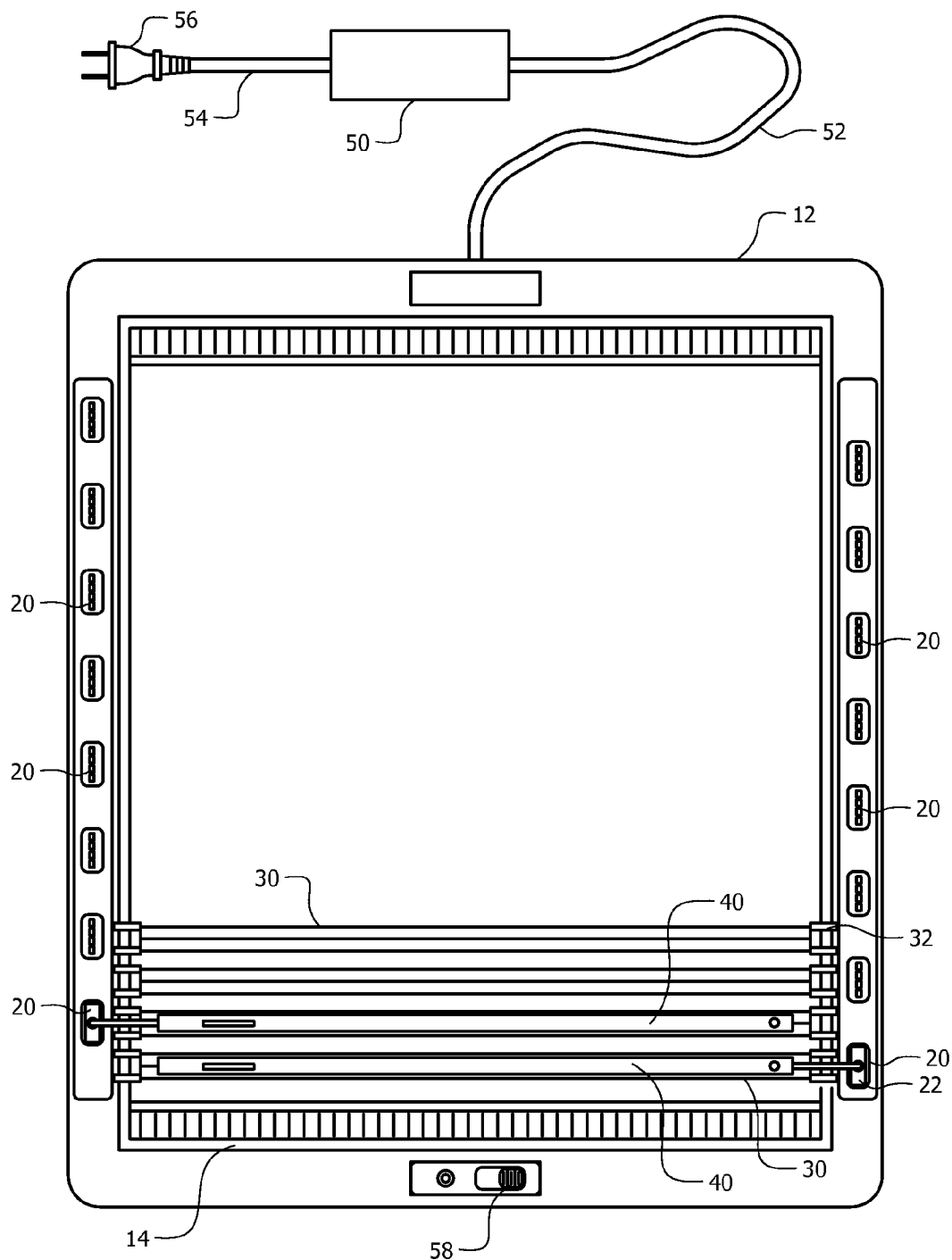
FIG. 3 illustrates a plan view of the hanging folder charge station showing a few hanging folders with two devices being charged.

Referring to FIG. 3, a plan view of the hanging folder charge station 10 showing a few hanging folders 30/32 with two devices 40 being charged is shown. In this view, the charging ports 20 are shown staggered such that a first device 40 within the first file folder 30/32 is charged by a first cable 22/24/26 connected to a port 20 on one side of the base 12 while a second device 40 within the second file folder 30/32 is charged by a second cable 22/24/26 connected to a port 20 on an opposing side of the base 12. This staggered port 20 configuration reduces clutter from the cables 22/24/26. In other embodiments, other configurations of ports 20 are anticipated including all ports on one side of the base 12 and ports on any surface of the base 12.

The hanging folder charge station 10 receives power from home/office power distribution networks such as the 117 VAC power distribution system used in the US or any such system. Although any known system for converting such power into specific voltages and currents used to charge the individual devices 40 is anticipated, one such example is shown in FIG. 3 including a plug 56 that interfaces with the power distribution system and is connected to a power supply brick 50 by a power cable 54. The power supply brick 50 has circuitry as known in the art to convert the power distribution power (e.g. 117 VAC) into DC power (e.g. 5 VDC) and the DC power is conducted into the hanging folder charge station 10 through a DC power cable 52 and distributed internally to the jacks 20. Note that, in some embodiments, circuitry within the hanging folder charge station 10 further conditions the power and/or limits current to each jack 20.

Figure 4:
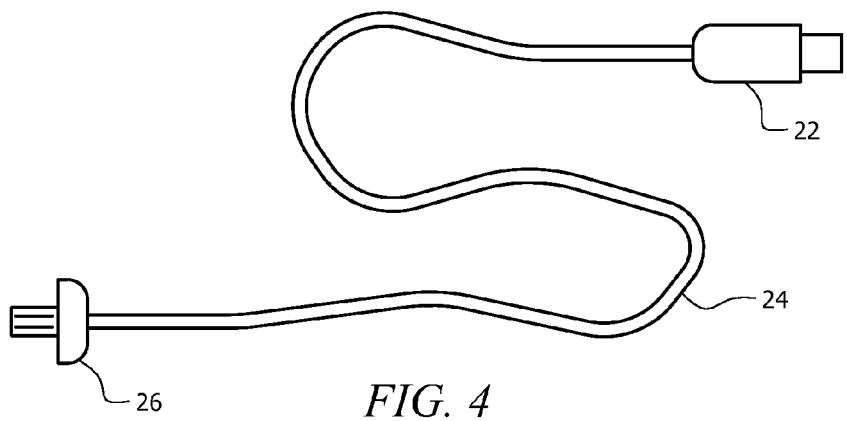
FIG. 4 illustrates a typical charging cable.

Referring to FIG. 4 illustrates a typical charging cable 22/24/26 is shown. This example of a typical charging cable 22/24/26 has a plug 22 that interfaces with the jacks 20 of the hanging folder charge station 10. The plug 22 is physically and electrically connected to a device plug 26 by a cable 24 having electrical conductors as known in the industry. The device plug 26 corresponds to a power jack 42 (see FIG. 5) on a corresponding device 40 that is to be charged. For example, some tablet computers 40 and cell phones 40 have micro-USB power jacks 42 and, for such, the device plug 26 is a micro-USB plug 26. Some devices use proprietary power jacks 42 and, for such, cables 22/24/26 having proprietary device plugs 26 are used, etc.

Figure 5:
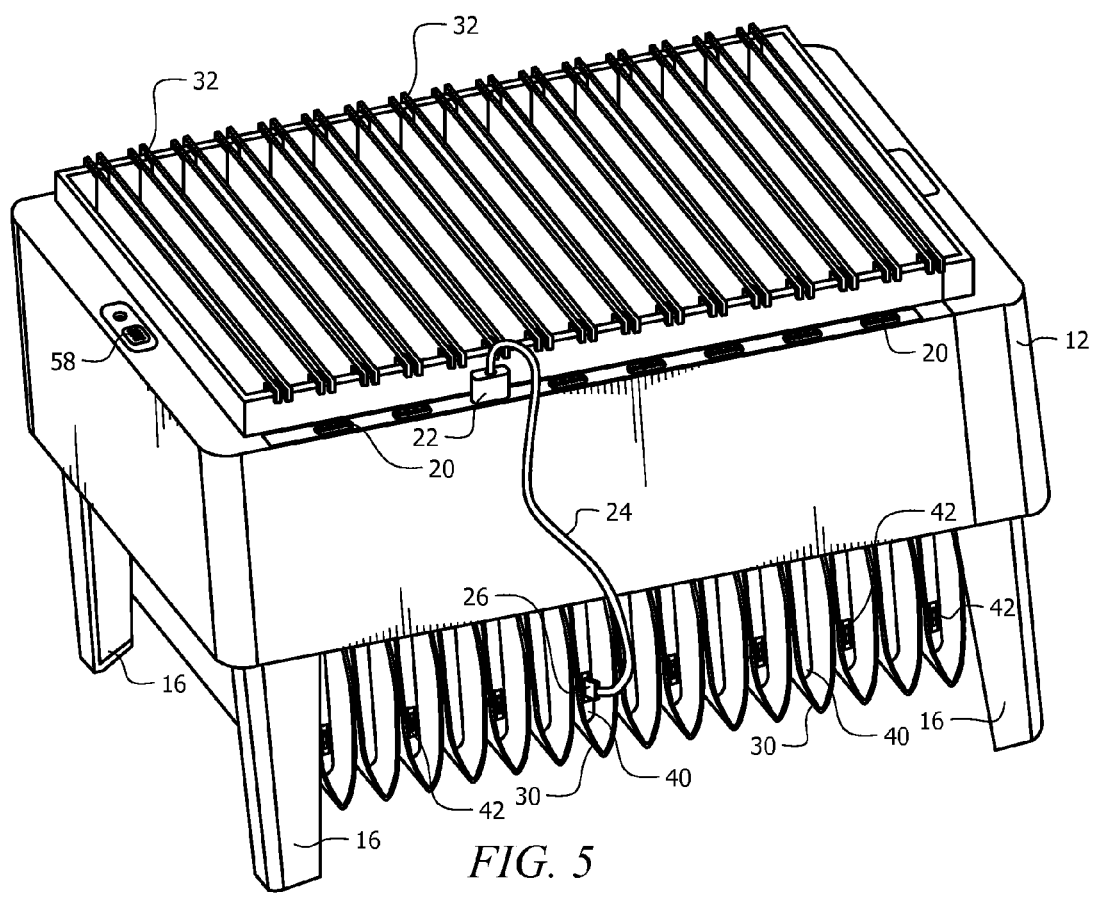
FIG. 5 illustrates a pictorial view of the hanging folder charge station showing one device connected to power and/or data.

Referring to FIG. 5, a pictorial view of the hanging folder charge station 10 showing one device 40 connected to power and/or data through a cable 22/24/26 is shown. In this view, the plug 22 of the cable 22/24/26 is electrically interfaced to the hanging folder charge station 10 through one of the jacks 20, providing power to the cable 22/24/26. The power passes from the plug through wires 24 to the device plug 26 which is inserted into a power jack 42 of one of the devices 40, thereby providing power, and optionally a data connection, to that device 40.

Note that in the view of FIG. 5, the cable 22/24/26 passes outside of the base 12 from the jack 20 to the device power jack 42. This is an example and it is also anticipated that the cable 22/24/26 pass inside the base 12.

Figure 6:
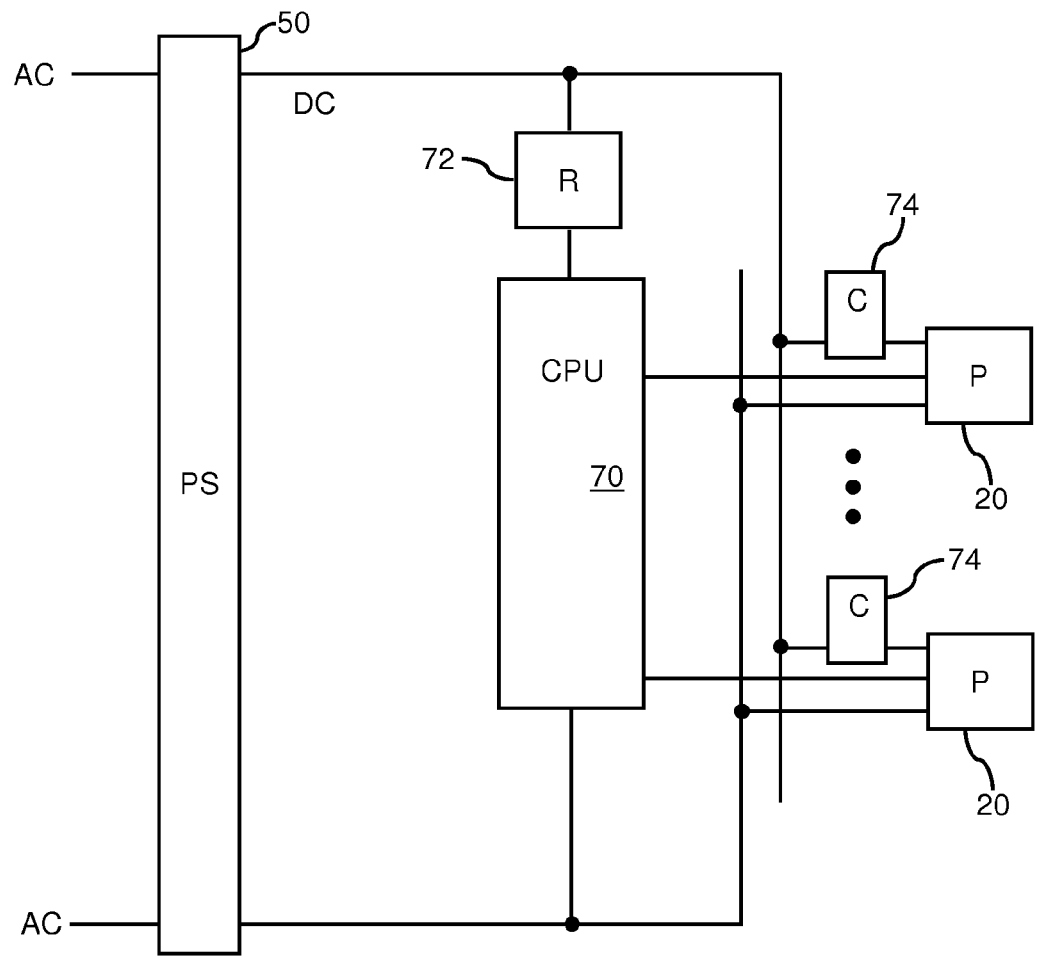
FIG. 6 illustrates a schematic view of the hanging folder charge station showing an exemplary circuit for providing power and/or data.

Referring to FIG. 6, a schematic view of the hanging folder charge station 10 showing an exemplary circuit for providing power and/or data is shown. Although many power/data circuits are possible and anticipated, the exemplary circuit of FIG. 6 shows AC power connected to the power supply 50 (e.g. a power brick 50, internal power supply, etc.) which converts the distributed power (typically AC power) into DC power such as 5 volts DC (5 VDC). Optionally, in this example, is a processor 70 that receives power from the DC power through a regulation circuit 72 as needed.

For simplicity, two of the plurality of ports 20 are shown. Each port 20 is connected to power from the power supply 50. In some embodiments, the power from the power supply 50 passes through a current control device 74 that prevents too much current from being supplied to the ports 20. In some embodiments, data connections are made to the ports 20 from the processor 70 (or from any known processor, internal or external to the hanging folder charge station 10.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A device charging system comprising:
   a base, the base having two opposing rim edges, the rim edges being substantially parallel to each other and the rim edges being spaced apart by a width corresponding to a hanging folder rail width;
   a first plurality of jacks spaced along a first opposing rim edge of the two opposing rim edges and a second plurality of jacks spaced along a second opposing rim edge of the two opposing rim edges;
   a plurality of hanging folders, the hanging folders having integrated hanging folder rails and the hanging folder rails interface to the two opposing rim edges, the hanging folder rails being the width corresponding to the hanging folder rail width; and
   a source of power, the source of power electrically connected to each of the jacks of the first plurality of jacks and the second plurality of jacks;
   whereas each of a plurality of devices are physically held within a corresponding hanging folder and each of the plurality of devices is electrically connected to one of the plurality of jacks by a charging cable, thereby providing power from the source of power to charge the plurality of devices.

2. The device charging system of claim 1, wherein each of the plurality of devices is selected from the group consisting of a tablet computer, a smart phone, and a digital music player.

3. The device charging system of claim 1, further comprising a plurality of current control devices, each current control device connected between the source of power and a corresponding jack, the current control device limiting current provided to the corresponding jack.

4. The device charging system of claim 1, further providing a data connection between at least one computer and each of the jacks.

5. The device charging system of claim 1, wherein the jacks of the first plurality of jacks are staggered with respect to the jacks of the second plurality of jacks.

6. The device charging system of claim 1, wherein each jack in the first plurality of jacks are positioned at an offset to a corresponding each jack of the second plurality of jacks such that a first jack of the first plurality of jacks aligns with a first hanging folders of the plurality of hanging folders and a first jack of the second plurality of jacks aligns with a second sequential hanging folders of the plurality of hanging folders.

7. The device charging system of claim 1, further comprising a plurality of legs.

8. The device charging system of claim 1, further comprising a plurality of legs, the legs provided separate from the base for later attachment to the base.

9. A method of charging a plurality of devices, the method comprising:
   using a charging system comprising a base, the base having two opposing rim edges, the rim edges being substantially parallel to each other and the rim edges being spaced apart by a width corresponding to a hanging folder rail width; a plurality of ports located in parallel with the rim edges and adjacent to the rim edges, each of the plurality of ports connected to a source of power;
   inserting a first hanging folder having a first hanging folder rail interfaced there within into the charging system, each end of the first hanging folder rail interfaced to a respective one of the two opposing rim edges;
   connecting a first device of the plurality of devices to a first port of the plurality of ports through a first charging cable;
   placing the first device into the first hanging folder;
   inserting a second hanging folder having a second hanging folder rail interfaced there within into the charging system, each end of the second hanging folder rail interfaced to a respective one of the two opposing rim edges;
   connecting a second device of the plurality of devices to a second port of the plurality of ports through a second charging cable;
   placing the second device into second hanging folder.

10. The method of claim 9, wherein the plurality of ports is a plurality of standard Universal Serial Bus (USB) ports.

11. The method of claim 10, wherein each of the first charging cable and the second charging cable is terminated at one end by a standard Universal Serial Bus (USB) plug that mates with one of the ports.

12. The method of claim 11, wherein the first charging cable is terminated at a distal end to a standard micro USB plug and the standard micro USB plug is connected to the first device.

13. The method of claim 11, wherein the second charging cable is terminated at a distal end to a proprietary plug and the proprietary plug is connected to the second device.

14. The method of claim 9, further comprising a step of concurrently providing charging power from the source of power to all of the jacks.

15. The method of claim 9, further comprising a steps of:
   providing charging power from the source of power to the first port;
   sensing when the first device stops charging;
   stopping of providing charging power from the source of power to the first port;
   providing power from the source of power to the second port.

16. A device charging system comprising:

a base, the base having two opposing rim edges, the rim edges being substantially parallel to each other and the rim edges being spaced apart by a width corresponding to a hanging folder rail width;

a first plurality of jacks spaced along a first opposing rim edge of the two opposing rim edges and a second plurality of jacks spaced along a second opposing rim edge of the two opposing rim edges;

a plurality of hanging folders for holding devices that are to be charged/stored, the hanging folders hanging by one of the integrated hanging folder rails, each end of the one of the integrated hanging folder rails interfaced to a corresponding one of the two opposing rim edges; and a source of power, the source of power electrically connected to each of the jacks of the first plurality of jacks and the second plurality of jacks.

17. The device charging system of claim 16, wherein the first plurality of jacks are positioned adjacent to and along a first rim edge of the two opposing rim edges and the second plurality of jacks are positioned adjacent to a second rim edge of the two opposing rim edges.

18. The device charging system of claim 17, wherein each of the first plurality of jacks are positioned at an offset to a corresponding each of the second plurality of jacks such that a first jack of the first plurality of jacks aligns with a first hanging folders of the plurality of hanging folders and a first jack of the second plurality of jacks aligns with a second, adjacent hanging folders of the plurality of hanging folders.

19. The device charging system of claim 16, wherein the source of power is electrically connected to a first one of the jacks of the first plurality of jacks and the second plurality of jacks, then after detection of a charge termination of the first one, the source of power is electrically disconnected from the first one the source of power is electrically connected to a second one of the jacks of the first plurality of jacks and the second plurality of jacks.

\* \* \* \* \*